Figure 12:
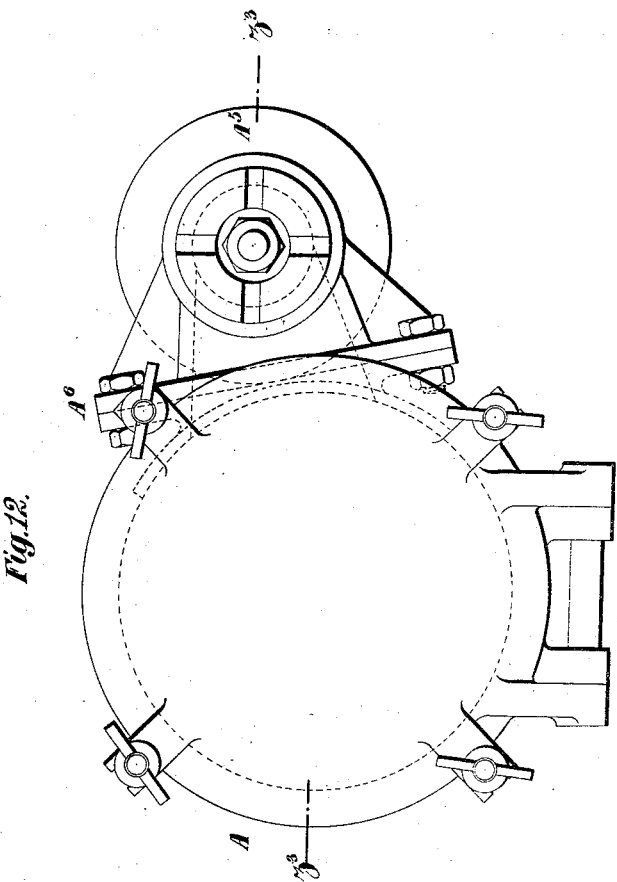

(No Model.)
J. B. G. A. CANET.
APPARATUS FOR LAUNCHING FISH TORPEDOES.
No. 470,286. Patented Mar. 8, 1892.
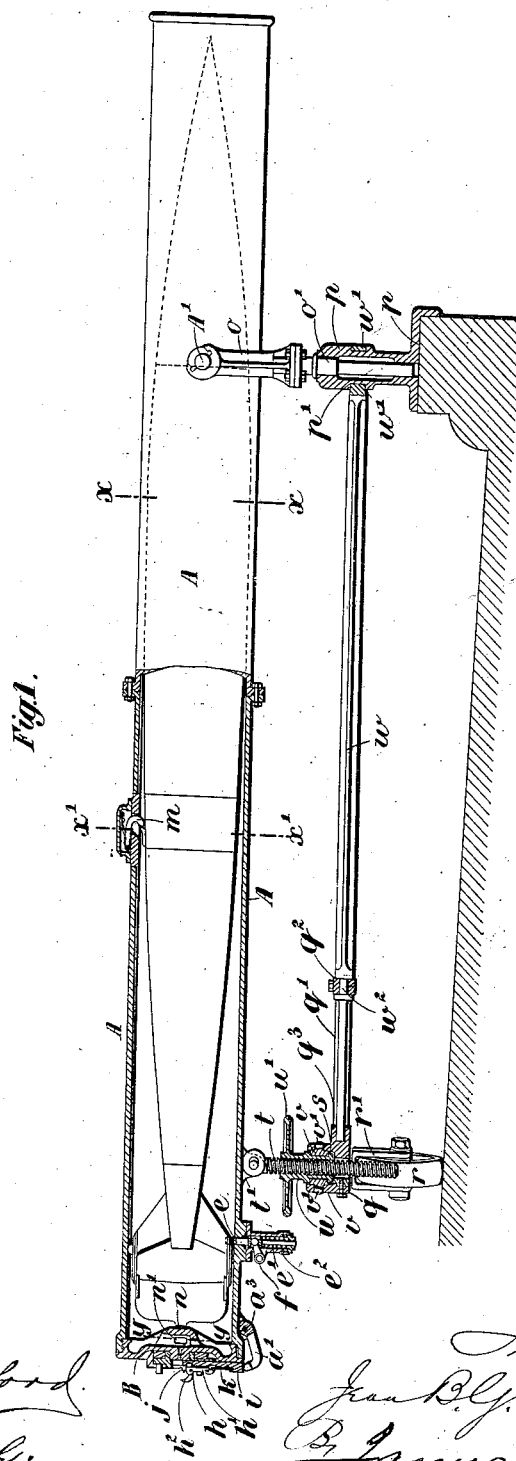

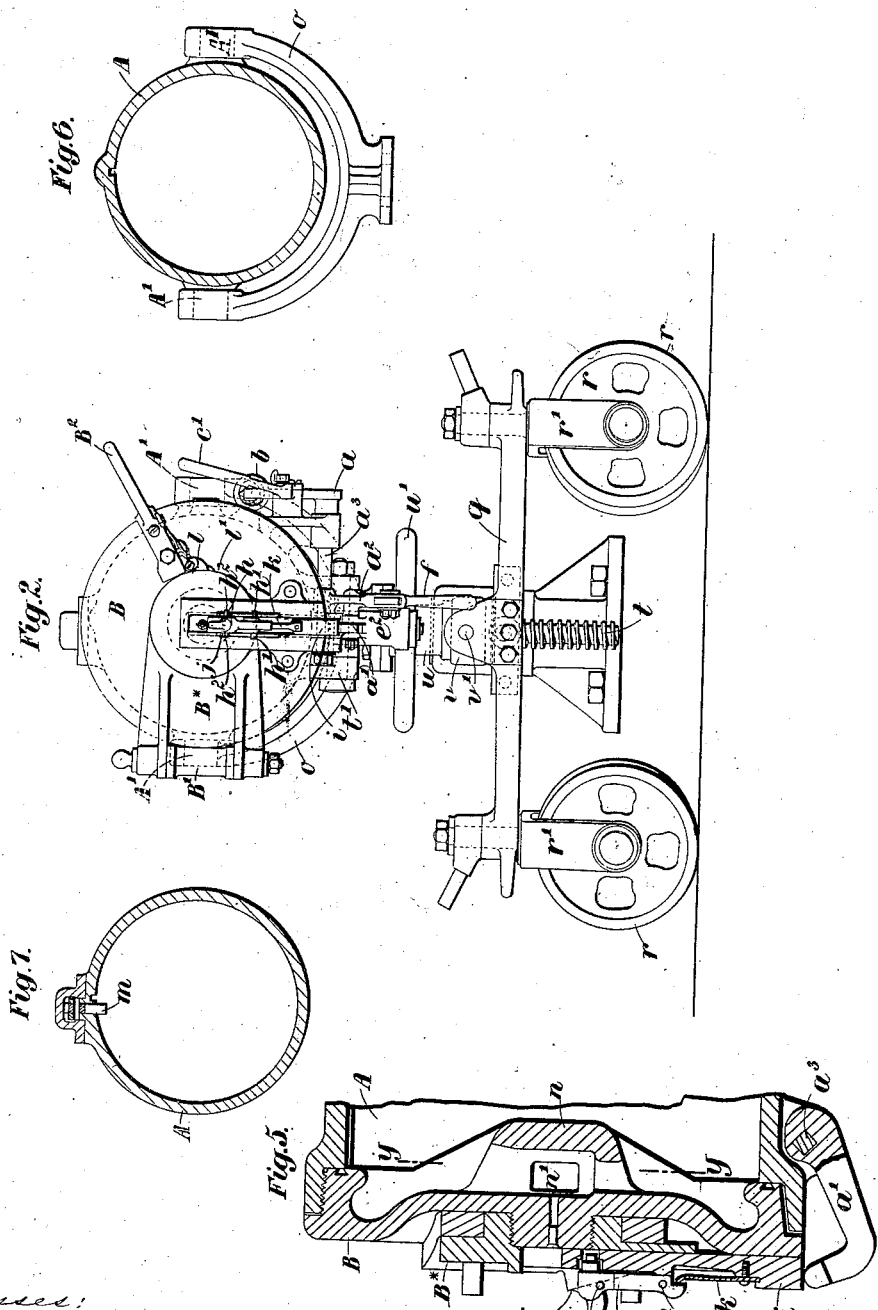

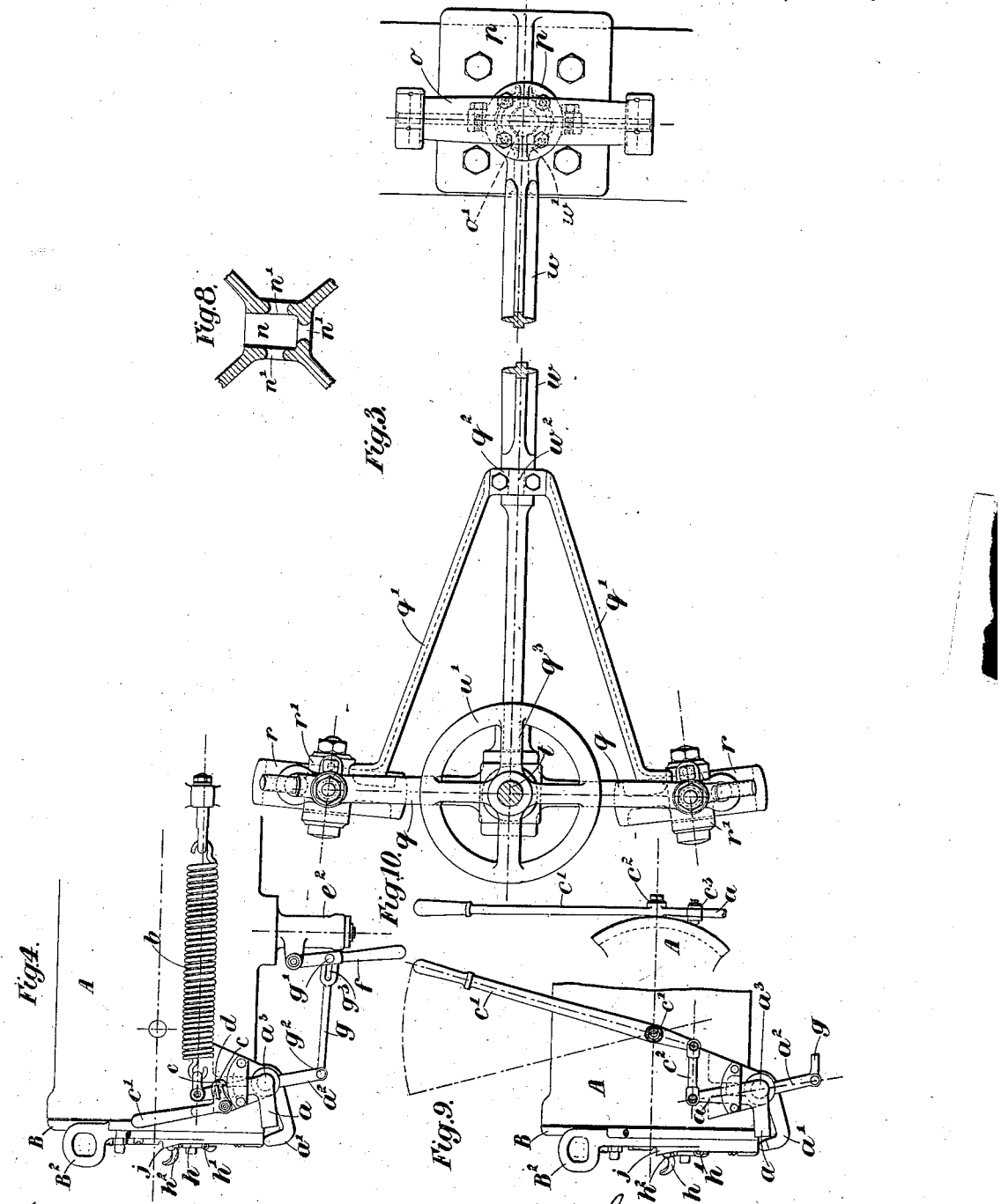

(No Model.)  
6 Sheets—Sheet 4.
J. B. G. A. CANET.
APPARATUS FOR LAUNCHING FISH TORPEDOES.
No. 470,286.  
Patented Mar. 8, 1892.
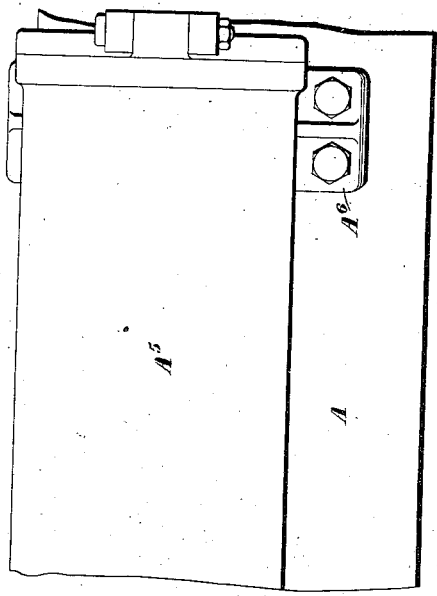
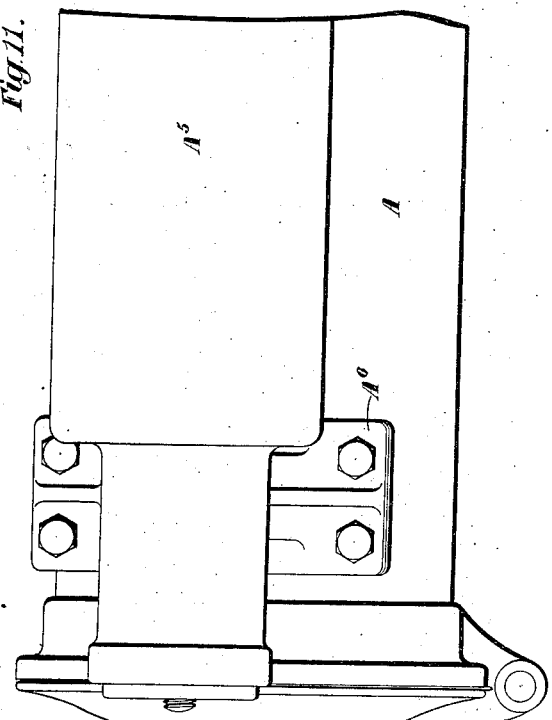
Fig. 11.

(No Model.)　　　　　J. B. G. A. CANET.　　　6 Sheets—Sheet 5.
APPARATUS FOR LAUNCHING FISH TORPEDOES.

No. 470,286.　　　　　　　　Patented Mar. 8, 1892.

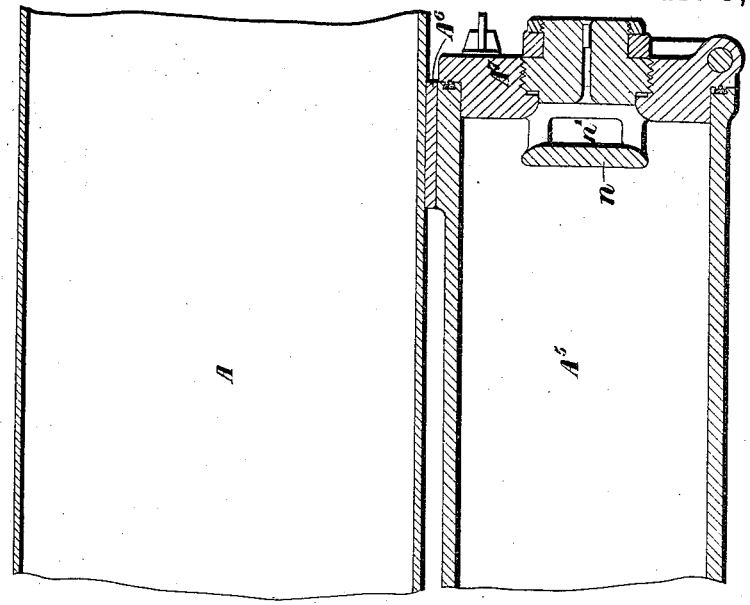
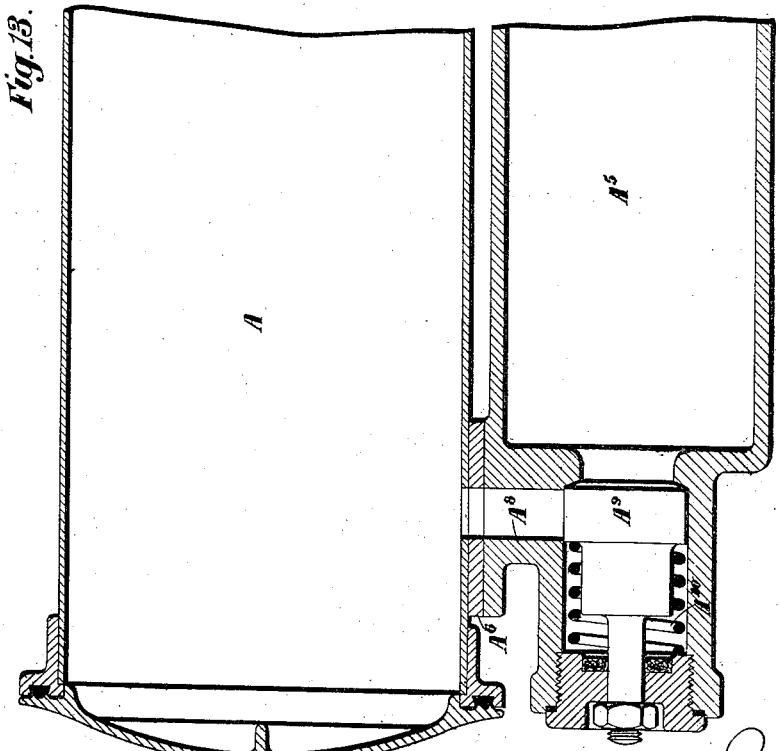

UNITED STATES PATENT OFFICE.

JEAN BAPTISTE GUSTAVE ADOLPHE CANET, OF PARIS, FRANCE, ASSIGNOR OF ONE-HALF TO THE SIR JOSEPH WHITWORTH & COMPANY, LIMITED, OF OPENSHAW, ENGLAND.

APPARATUS FOR LAUNCHING FISH-TORPEDOES.

SPECIFICATION forming part of Letters Patent No. 470,286, dated March 8, 1892.

Application filed March 21, 1889. Serial No. 304,204. (No model.) Patented in France October 8, 1883, No. 157,914; in England November 29, 1883, No. 5,565, and in Germany September 13, 1884, No. 28,442.

*To all whom it may concern:*

Be it known that I, JEAN BAPTISTE GUSTAVE ADOLPHE CANET, engineer, a citizen of the Republic of France, and a resident of Paris, France, have invented a new and useful Improved Method of and Apparatus for Launching Fish-Torpedoes, (for which I have obtained patents in Great Britain, No. 5,565, bearing date November 29, 1883; in France, No. 157,914, bearing date October 8, 1883; certificate of addition bearing date May 3, 1886; certificate of addition bearing date April 14, 1887, and certificate of addition bearing date April 25, 1887, and in Germany, No. 28,442, bearing date September 13, 1884,) of which the following is a specification, reference being had to the accompanying drawings.

My invention is designed to provide in a more efficient manner than heretofore for the launching of fish-torpedoes—that is to say, torpedoes provided with mechanism for propelling them through the water after they have been launched. Such vessels have heretofore been discharged by means of compressed air or steam; but an important feature of my said invention is a novel method of providing for the discharge of a torpedo from a tube by means of gunpowder or other explosive material.

My said invention, moreover, comprises the combination, with the discharging mechanism, of a spring in which before the torpedo is inserted in the tube energy can be stored up for subsequently effecting the explosion of the powder, so that the gunner, having laid the tube, has only to exert a slight effort in pulling a trigger, whereby he can effect the discharge of the torpedo without impairing the accuracy of the aim.

My said invention also comprises a novel and peculiar arrangement of the carriage which affords greater facility for training the tube without the aid of racers and which adjusts itself to suit the slope of the deck of a ship.

It also comprises improved mechanism whereby the breech of the tube is closed and whereby the charge can be fired when, but not until, the breech is properly closed. This arrangement prevents accidents which might happen if the charge could be fired when the breech-piece or breech-plug is pushed home without being locked. The charge of explosive material for launching the torpedo is placed in a cavity or chamber provided in the breech-piece or breech-plug and is ignited by a fuse, which is exploded by the mechanism hereinafter described.

In the accompanying drawings, Figure 1 is a side elevation, partly in vertical longitudinal central section, of one form of my improved torpedo-tube and carriage. Fig. 2 is a rear elevation of the said tube and carriage, drawn to an enlarged scale. Fig. 3 is a plan, also drawn to an enlarged scale, of the said carriage, the tube being removed therefrom. Fig. 4 is a side elevation drawn to the same scale as Figs. 2 and 3, showing one arrangement of the discharging mechanism. Fig. 5 is a portion of Fig. 1 drawn to a still further enlarged scale. Fig. 6 is a transverse section of the tube on the line $x\ x$, Fig. 1, drawn to an enlarged scale. Fig. 7 is a transverse section of the said tube on the line $x'\ x'$, Fig. 1, also drawn to an enlarged scale. Fig. 8 is a transverse section through the powder-chamber on the line $y\ y$, Figs. 1 and 5. Fig. 9 is a side elevation, and Fig. 10 a rear elevation, showing another arrangement of the discharging mechanism. Fig. 11 is a side elevation, Fig. 12 is a rear elevation, and Fig. 13 is a horizontal section on the line $z^3\ z^3$, Fig. 12.

A is the torpedo-tube, which is mounted upon a carriage, hereinafter described, and the breech end of which is closed by means of a breech-piece or breech-plug B, formed with spiral projections or interrupted screw-threads like the breech-plug of a gun. The said plug is fitted to turn about its axis in a bracket B*, hinged to the tube at B', and is provided with an operating handle or lever B².

Referring to Figs. 1 to 8, $a\ a'\ a^2$ are levers fixed upon a shaft $a^3$, carried in suitable bearings attached to the tube A.

$b$, Figs. 2 and 4, is a spiral spring, one end of which is attached to the tube A and the other to the cranked lever $a$, so that the said spring may be extended by means of a hand-spike or bar applied to one arm of the said cranked lever. When the said spring is extended, the lever $a$ is held in its cocked position—that is to say, in the position shown in Fig. 4—by a catch or sear $c$ engaging with a stud or projection on the said lever. This catch or sear is provided with an arm or lever $c'$, serving as a trigger. $d$ is a safety-pin for preventing the accidental or premature release of the discharging mechanism. This pin is passed through a hole in the catch or sear $c$ and enters a corresponding hole in the lever $a$. On the same axis or shaft $a^3$ on which is keyed or otherwise fixed the crank-lever $a$ are also firmly fixed, as above mentioned, the levers $a'$ $a^2$. The lever $a'$ works the firing mechanism and the lever $a^2$ releases the torpedo within the tube A in the manner hereinafter described.

$e$ is a stop-bolt or catch provided with a spiral spring $e'$ and fitted in a suitable socket or casing $e^2$. The said stop-bolt or catch $e$ is adapted to engage with a shoulder on the torpedo, and thus retain the same in position in the tube A, and is arranged to be operated by a hand-lever $f$, whereby it may be disengaged from the torpedo.

$g$ is a connecting-rod coupled at $g'$ to the lever $f$ and at $g^2$ to the lever $a^2$. The coupling pin or bolt $g'$ is passed through a slot $g^3$ in the connecting-rod $g$, so that the lever $f$ may be operated by hand without disturbing the mechanism whereby it is automatically operated, as hereinafter set forth.

$h$ is the firing-hammer, which is pivoted at $h'$ to a slide-piece $i$, working in a groove in the breech-plug. The hammer $h$ is provided, moreover, with a stud $h^2$ upon each side thereof. These studs $h^2$ are adapted to move upon inclined planes $j$ when the slide-piece $i$ is raised, thereby cocking the firing-hammer $h$, the rear extremity of which bears against and compresses a flat spring $k$, secured to the said slide-piece.

$l$ is a spring-catch, which engages with a stop or projection $l'$ on the bracket B* and prevents the rotation of the breech-plug B about its axis to release the screw-threads thereof by means of the handle or lever $B^2$ till the said spring-catch is disengaged.

$m$, Figs. 1 and 7, is a spring-catch of the usual construction, which is placed at a suitable distance from the breech end of the tube and which as the torpedo is discharged from the tube acts on the starting-valve of the engines inside the said torpedo, thus insuring the propulsion of the torpedo through the water by the said engines after it is launched.

$n$ is the powder chamber or cavity, which is provided with a central hole for the insertion of the fuse or primer and with radial holes $n'$. To prevent the escape of gas, a ring of leather, asbestus, or other suitable material is let into the internal face of the breech, so that the breech-plug will bear against the same.

The operation of the above-described apparatus is as follows—that is to say: To insert a torpedo in the tube the gunner, by means of a hand-spike fitted on one end of the crank-lever $a$, extends the spring $b$, which is kept extended by the catch or sear $c$, and inserts the safety-pin $d$ in the holes in the said catch and in the lever $a$, as shown in Fig. 4. To open the breech, the gunner grasps the small hand-lever $B^2$ and gives one-sixth of a turn to the screw-threaded breech-plug B, thus moving it into the position shown in Fig. 2, so that the catch $l$ engages with the stop $l'$ and prevents movement of the breech-screw about its axis in its supporting-bracket while the breech is open, thus insuring the correspondence of its interrupted screw-threads with those in the breech when the breech-plug is swung upon the hinge B' to close the breech. The gunner then by pulling the said lever $B^2$ toward him swings the breech-plug and its adjuncts upon the hinge B' away from the breech. The tube is then ready to receive a torpedo, which is introduced carefully into the said tube while the stop-bolt or catch $e$ is depressed and withdrawn from the tube by means of the hand-lever $f$. This stop or catch is held down until the torpedo is well home. The said stop or catch is then released, the spring $e'$ causing it to rise and re-enter the tube and engage with the torpedo, so that the latter cannot leave the said tube prematurely. The charge of gunpowder or other explosive material is then inserted in the powder chamber or cavity $n$. The radial holes $n'$ of the said powder-chamber so direct the gases generated by the explosion that they first exert their force against the inner surface of the tube A and the torpedo will not be injured by the explosion. The breech is closed by swinging it inward upon the hinge B' and then turning it about its axis and screwing it home by means of the handle $B^2$ the spring-catch $l$ being released from the stop $l'$ to permit this operation. To permit the introduction of a fuse or primer, the hammer $h$ and sliding piece $i$ must be down, or in the position shown in Fig. 5. The fuse or primer being inserted, the tube is ready to be discharged. Should the breech not be properly closed, the end or nose of the lever $a'$ cannot enter the groove in which the slide-piece $i$ works, and therefore will not raise the said slide-piece and the hammer $h$ and the hammer will not be cocked or the fuse exploded. This mechanism therefore constitutes a safety device.

To effect the discharge, the gunner pulls out the safety-pin $d$, and by exerting a slight effort on the handle or lever $c'$ of the sear or catch $c$ he releases the lever $a$ and permits the reaction of the spiral spring $b$. The angular motion thereby imparted to the aforesaid three crank-levers $a$ $a'$ $a^2$, fixed on the shaft $a^3$, first depresses the stop-bolt or catch $e$ in the tube A, and immediately afterward explodes the fuse in the following manner—that is to say. The slide-piece $i$ and the hammer $h$, pivoted thereto, are pushed upward by the lever $a'$. The hammer is cocked by the studs $h^2$ rising upon the inclined planes $j$, (which inclined planes terminate opposite or nearly opposite the fuse or primer.) The spring $k$ is thereby compressed, and when the said studs $h^2$ arrive at and pass over the end of the said inclined planes $j$ the hammer $h$ is released and is caused by the reaction of the spring $k$ to strike and explode the fuse or primer.

The improvements in the construction of the carriage are as follows, viz: The front part of the carriage comprises a cross-head $o$, in which the tube A is held by its trunnions $A'$. This cross-head $o$ turns on a vertical pivot $o'$, supported in a suitable bearing in a strong bracket $p$, so that it can be adjusted for firing either fore or aft or at any desired angle. The rear or breech end of the carriage has a frame $q\ q'$, which rests on two rollers $r$, carried in forked pieces $r'$, capable of turning about vertical axes into any desired position. The part $q$ of this frame has a central hole $s$, through which extends the elevating-screw $t$. The screw $t$ is coupled to a lug $t'$ upon the under side of the tube A, and is moved up and down by a nut $u$, cast with or attached to a hand-wheel $u'$. This nut turns in a bearing $v$, formed in two halves and provided with horizontal trunnions $v'$, supported on the part $q$ of the frame. The front and rear parts of the carriage are united by the bar or rod $w$. This rod at its front end has a collar $w'$, which is fitted to turn horizontally upon and around the bracket $p$, to which it is journaled at $p'$. Near its rear end the rod $w$ is attached to the frame by means of a collar $q^2$ on the latter, fitting a journal $w^2$ on the connecting-rod $w$, and the rear extremity of the said connecting-rod turns in a socket $q^3$, provided in the part $q$ of the frame. This mode of connecting the rod $w$ and nut $u$ to the rear part of the carriage allows the frame $q\ q'$ and rollers $r$ to follow the slope of the ship's deck without deranging or disturbing the laying of the tube.

In the modification shown in Figs. 9 and 10 the spring $b$ is dispensed with and the devices for causing the discharge are operated by means of a long lever $c'$, which is pivoted at $c^2$ to the tube A, and the short arm of which is coupled to the lever $a$ by means of a connecting rod or link $c^3$.

In Figs. 11, 12, and 13 of the drawings I have illustrated an arrangement intended to obviate the difficulties that are met with in launching self-propelling torpedoes by means of gunpowder or other explosive material when the launching-tube contains water and to provide for permitting the complete expansion of the powder-gas in the apparatus. For this purpose I enlarge the chamber for containing the air-cushion and divide this chamber by means of a partition formed with an aperture or passage, which is closed by a suitable loaded valve. After the discharge of a torpedo this valve closes automatically and prevents access of water to the powder-chamber.

In the arrangement shown in Figs. 11, 12, and 13 I combine with the launching-tube A a reservoir or auxiliary tube $A^5$ of convenient capacity. The reservoir or auxiliary tube $A^5$ is preferably joined to the tube A by means of brackets or flanges bolted together, as at $A^6$. The said reservoir or auxiliary tube is provided at one of its extremities with a door $A^7$, through which the cartridge or charge of explosive material can be introduced. For firing the charge I prefer to employ devices such as those hereinbefore described. Communication between the reservoir or auxiliary tube $A^5$ and the tube A is established by means of a passage $A^8$, which is normally closed by a valve $A^9$, provided with a spiral spring $A^{10}$. The tube $A^5$ therefore forms an enlargement of the chamber for containing the air-cushion between the powder-charge and the rear end of the torpedo and insures the more effectual cushioning of the latter or diminution of the initial pressure exerted thereon. The valve $A^9$ lifts automatically under the pressure of the gases caused by the explosion of the charge in the reservoir or auxiliary tube $A^5$ and permits the said gases to enter the launching-tube A and eject the torpedo therefrom.

What I claim is—

1. In an apparatus for launching torpedoes, the combination, with a chamber for containing an air-cushion between the explosive material and the torpedo, of a powder-chamber arranged within the air-chamber and having apertures in its circumference through which the gases generated by the explosion will pass into the said air-chamber, substantially as and for the purposes above specified.

2. In an apparatus for launching torpedoes, the combination of a chamber for containing a cushion of air between the explosive material and the torpedo, divided by a partition having an aperture or passage through it, a loaded valve for closing the said aperture or passage, and a powder-chamber arranged within the air-chamber and having radial apertures communicating therewith, substantially as and for the purposes set forth.

3. In a torpedo-launching apparatus, the combination, with a torpedo-tube, of a spring-bolt arranged to slide in a cavity or slot in the said tube and to enter the latter and engage with a torpedo therein, and a lever connected with the said bolt for effecting the withdrawal of the same and thus releasing the torpedo, substantially as described.

4. The combination, with the torpedo-tube and the spring stop-bolt for retaining a torpedo therein, of a firing-hammer or striker, and means, substantially such as above described, for effecting the disengagement of the said stop-bolt and the release of the said hammer or striker by a simple movement of an operating-lever connected with said means, substantially as and for the purposes set forth.

5. The combination, with the tube A, of the breech-plug B, the slide-piece $i$, the hammer or striker $h$, pivoted thereto and provided with the studs $h^2$, the inclined surfaces $j$ on the said breech-plug, the lever $a'$, and means, substantially such as above described, for operating the said lever, substantially as and for the purposes set forth.

6. The combination, with the tube A and the breech-plug B, provided with the inclined surfaces $j$, of the slide-piece $i$, the hammer or striker $h$, pivoted thereto and provided with the studs $h^2$, the spring stop-bolt $e$, the lever $f$ for operating the same, the lever $a$, and means, substantially such as above described, for operating the said levers, substantially as and for the purposes set forth.

7. The combination, with a torpedo-tube, of firing mechanism therefor, a stop-bolt adapted to enter the said tube and engage with a torpedo therein, an operating-lever connected with the said firing mechanism, a lever connected with the said stop-bolt for withdrawing the same independently of the firing mechanism, and connecting devices between the said levers, which, while permitting such independent withdrawal of the said bolt, insures its withdrawal simultaneously with the operation of the firing mechanism, substantially as and for the purposes set forth.

8. The combination, with the torpedo-tube, the breech-plug, and the bracket hinged or pivoted to the said tube and carrying the said breech-plug, of a lever for turning the said breech-plug and a spring-catch for locking it to the said bracket when disengaged from the screw-threads in the breech end of the said tube, substantially as and for the purpose set forth.

9. The combination, with the tube A and breech-plug B, of the slide-piece $i$, working in a groove in the said breech-plug, the hammer $h$, pivoted to the said slide-piece and adapted to be first cocked and then released in the upward movement thereof, the shaft $a^3$, the bent lever $a$, fixed thereon, the spring $b$, connected with the said lever and with the tube A, the sear $c$, adapted to engage with the said lever, the lever $a'$, also fixed on the said shaft and bearing against the lower end of the said slide-piece $i$, the stop-bolt $e$, adapted to enter the tube A and engage with a torpedo therein, the lever $f$, connected with the said bolt, the lever $a^2$, also fixed on the said shaft $a^3$, and the slotted link $g$, connecting the said levers $a^2$ $f$, substantially as and for the purposes set forth.

10. In an apparatus for launching torpedoes by the explosive force of gunpowder or similar material, the breech-plug provided with the powder-chamber having radial holes or passages for the gas, so as to prevent injury to the torpedo by the explosion of the powder, substantially as set forth.

In testimony whereof I have hereunto signed my name in the presence of two subscribing witnesses.

JEAN BAPTISTE GUSTAVE ADOLPHE CANET.

Witnesses:
J. L. RATHBONE,
R. J. PRESTON.